(12) United States Patent
David (10) Patent No.: US 9,645,850 B2
(45) Date of Patent: May 9, 2017

(54) TASK TIME ALLOCATION METHOD ALLOWING DETERMINISTIC ERROR RECOVERY IN REAL TIME

(71) Applicant: KRONO-SAFE, Orsay (FR)

(72) Inventor: Vincent David, Marcoussis (FR)

(73) Assignee: KRONO-SAFE, Orsay (FR)

( * ) Notice: Subject to any disclaimer, the term of this patent is extended or adjusted under 35 U.S.C. 154(b) by 0 days.

(21) Appl. No.: 14/784,138

(22) PCT Filed: Mar. 17, 2014

(86) PCT No.: PCT/FR2014/050613
§ 371 (c)(1),
(2) Date: Oct. 13, 2015

(87) PCT Pub. No.: WO2014/170569
PCT Pub. Date: Oct. 23, 2014

(65) Prior Publication Data
US 2016/0055032 A1  Feb. 25, 2016

(30) Foreign Application Priority Data

Apr. 19, 2013 (FR) ..................... 13 53630

(51) Int. Cl.
*G06F 9/46* (2006.01)
*G06F 9/48* (2006.01)
*G06F 11/07* (2006.01)

(52) U.S. Cl.
CPC ........ *G06F 9/4887* (2013.01); *G06F 11/0793* (2013.01); *Y02B 60/144* (2013.01)

(58) Field of Classification Search
None
See application file for complete search history.

(56) References Cited

U.S. PATENT DOCUMENTS

2003/0187907 A1  10/2003  Ito

OTHER PUBLICATIONS

Chabrol, Damien et al., "A Spatial and Temporal Partitioning Approach for Dependable Automotive Systems," Emerging Technologies & Factory Automation, Sep. 22, 2009, IEEE, pp. 1-8.

(Continued)

*Primary Examiner* — Gregory A Kessler
(74) *Attorney, Agent, or Firm* — Oliff PLC (57) ABSTRACT

A method for executing tasks of a real-time application on a multitasking computer, steps including: defining time-windows, each associated with the execution of processing operation of task of the application, allocating to each processing operation having time-window, time-quota and time-margin, time allocated to processing operation by time-quota and time-margin being shorter than duration of time-window of processing operation, during the execution of application, activating each processing operation at the start of time-window with which it is associated, on expiry of time-quota of one of processing operations, activating an error mode if the execution of processing operation has not been completed and, if error mode is active for one of processing operations, executing an error handling operation for processing operation, during remaining time allocated to processing operation by time-quota and time-margin.

11 Claims, 3 Drawing Sheets

(56) References Cited

OTHER PUBLICATIONS

Bougueroua, Lamine et al., "Temporal Robustness of Real-Time Architectures Specified by Estimated WCETs," International Journal on Advances in Software, vol. 2, Jan. 1, 2009, pp. 359-371.
Oct. 20, 2015 International Preliminary Report on Patentability issued in International Patent Application No. PCT/FR2014/050613.
Aug. 4, 2014 Search Report issued in International Patent Application No. PCT/FR2014/050613.

TASK TIME ALLOCATION METHOD ALLOWING DETERMINISTIC ERROR RECOVERY IN REAL TIME

The present invention relates to real-time multitasking systems, comprising a set of time-independent tasks clocked by a same time base, and for which the execution time constraints are known. The present invention relates in particular to real-time systems requiring a high level of performance in their implementation, and critical systems for which a high guarantee level is required as to the use of execution hardware resources allocated for each task of the system.

The present invention applies in particular to command and control systems such as those used in the fields of transportation (automotive, rail, sea and air), industrial automata, energy, and other systems for which controlled allocation of resources is important, as in communication networks.

In critical real-time systems, tasks are often executed according to static scheduling methods, so as to perform a static time allocation of time quotas for using execution resources such as the processor. This enables time-independence of the tasks between themselves to be demonstrated as regards the use of resources, and in particular, those of the processor. This simple and widely accepted vision does not take into account the problem of communications between tasks, which is particularly addressed in documents [3], [4], [7], [8]. However, this vision poses problems of implementation on today's processors that include cache memories. Indeed, the content of these cache memories depends on the entire history of execution of the tasks and data accessed. Now, the state of these memories impacts the execution times of the processing operations of interleaved tasks. Under these conditions, it is difficult to guarantee an absolute upper bound of the execution time (WCET—Worst Case Execution Time—cf. document [5]) of a processing operation. Formal methods of calculating these upper bounds thus lead to a potentially significant overestimation of these upper bounds compared to experimental results.

Furthermore, in certain real-time multitasking systems, it is necessary to ensure that the tasks do not interfere with each other, i.e. that a task cannot be executed or that its execution cannot end during the time allocated to another task. The quest for such non-interference between tasks leads in certain fields to deactivating cache memories or to emptying them of their entire content at the start of each time window allocated to a processing operation so as to have a state (empty) that is independent of the execution of previous processing operations. However, this operation of emptying cache memories significantly penalizes the performance of the multitasking system. In addition, a processing operation may in some cases be divided into several time windows, which requires emptying the cache memories several times during the execution of the processing operation.

For these different reasons, the designers of real-time systems are forced to greatly over-size such systems. From a practical point of view, so as to render this approach less penalizing, the time allocation of the processor is performed based on an execution time requirement that is shorter than the "theoretical" WCET, leading to accepting a certain error rate. The main drawback of this approach lies in the absence of any model characterizing the law of distribution of the execution times of a processing operation, truly enabling the error rate to be assessed in relation to an allocated time quota. In particular, when the acceptable error rate must be very low, and thus results from very rare events, it is not possible with this approach, which is based on too few experimental samples, to demonstrate that these systems have a deterministic behavior. Therefore, to improve the robustness of such systems, one well-known method involves implementing error-recovery measures for such errors on the execution time quotas, to reduce cases of residual errors to an extremely low number.

It shall be noted that to overcome this significant problem of over-sizing, it is common to use the unused time (difference between the average execution time and the allocated time quota) by reallocating it dynamically to non-real-time and non-critical tasks, executed as non-priority background tasks (cf. documents [2], [7], [8]). However, this solution does not meet the same objective and does not contribute anything to critical real-time tasks.

In the same way, for other types of errors susceptible of appearing during the execution of a critical real-time task, it is beneficial to have such deterministic real-time error handling mechanisms, without any interference with the other tasks being executed. This allows error recovery without any discontinuity in the task execution flow and guarantees the implementation of adequate actions with adequate time constraints. These problems have known solutions in asynchronous systems, i.e. without any execution time constraints. However, these solutions do not provide any real-time performance guarantee, and they are not adapted to the context of critical tasks where non-interference between the processing operations is sought, including of course in the event of an operational malfunction.

It is thus desirable to be able to generate an application comprising a set of tasks clocked by a same time base, while guaranteeing efficient and reliable use of the multitasking system on which the tasks are executed. It may further be desirable to be able to allocate a sufficient time to error handling, so that it can be done in deterministic time, compatible with the constraints of a critical real-time system, without any risk of interference with the other tasks. It may also be desirable to use the unused allocated time for different optimizations such as thermal regulation, minimizing energy consumption, or the distributed or shared execution of non-critical tasks. It may further be desirable to be able to guarantee correct sequencing of the processing of the tasks of an application, executed by a multitasking system, and to be able to formally demonstrate that this sequencing is correct.

Some embodiments relate to a method for executing tasks of a real-time application on a multitasking computer, each task comprising at least one processing operation, the method comprising steps of: defining time windows each associated with the execution of a processing operation of a task of the application, allocating to each processing operation having a time window, a time quota and a time margin, the time allocated to the processing operation by the time quota and the time margin being shorter than the duration of the time window associated with the processing operation, during the execution of the application by the multitasking system, activating each processing operation at the start of the time window with which it is associated, on expiry of the time quota of one of the processing operations, activating an error mode if the execution of the processing operation has not been completed, and if the error mode is active for one of the processing operations, executing an error handling procedure for the processing operation in error mode, during the remaining time allocated to the processing operation by the time quota and the time margin.

According to one embodiment, the method comprises steps of: if the error mode is active for one of the processing operations, continuing the execution of the processing operation the execution of which has not been completed on expiry of the time quota allocated to the processing operation, while monitoring the expiry of the time margin allocated to the processing operation, and on expiry of the time margin allocated to the processing operation, if the execution of the processing operation has not been completed, ending the execution of the processing operation and executing a time quota overrun error handling operation.

According to one embodiment, the method comprises steps of: fragmenting the processing operations associated with a time window extending over several time windows for processing other tasks of the application, so that each time window is exclusively associated with a processing operation or processing operation fragment, allocating a time quota to each of the processing operation fragments such that the sum of the time quotas of all the fragments of the fragmented processing operation is equal to the time quota of the fragmented processing operation, the time margin associated with the fragmented processing operation being associated with the last fragment of the fragmented processing operation, and associating with each processing operation fragment a state variable indicating whether it is the last fragment of the fragmented processing operation, the error mode not being activated on expiry of the quota of a processing operation fragment if the state variable associated with the processing operation fragment indicates that the processing operation fragment is not a last fragment of a fragmented processing operation.

According to one embodiment, the margin of each of the processing operations associated with a time quota is calculated by applying a multiplying factor to the time quota of the processing operation, the multiplying factor being identical for all the processing operations associated with a time quota.

According to one embodiment, the multiplying factor is determined so that the tasks of the application can be scheduled according to the time requirements of the processing operations, to the time windows associated with the processing operations, and to the features of the computer.

According to one embodiment, the processing operations are executed by a processor clocked by a first time base, and the time windows associated with the processing operation are defined in a second time base not regular compared to the first time base, a time unit in the second time base having a minimum value in the first time base, the multiplying factor being defined according to the minimum value.

According to one embodiment, each processing operation is associated with a state variable indicating whether it performs an input/output in relation to a processor executing the processing operation and, if one of the processing operations is associated with a state variable indicating that the processing operation does not perform any input/output, the execution of the processing operation is launched without waiting for the start of the time window of the processing operation, as soon as the execution of a previous processing operation ends.

Some embodiments also relate to a real-time multitasking system comprising a multitasking computer executing a real-time application comprising several tasks, each task comprising at least one processing operation, the system being configured to: store time windows, each associated with the execution of a set of processing operations of tasks of the application, store for each processing operation having a time window, a time quota and a time margin, the time allocated to the processing operation by the time quota and the time margin being shorter than the duration of the time window of the processing operation, execute the processing operations of the application, and on expiry of the time quota of one of the processing operations, activate an error mode if the execution of the processing operation has not been completed, and if the error mode is active for one of the processing operations, to execute an error handling procedure for the processing operation in error mode, during the remaining time allocated to the processing operation by the time quota and the time margin.

According to one embodiment, the system is configured to: if the error mode is active for one of the processing operations, continue the execution of the processing operation the execution of which has not been completed on expiry of its time quota, while monitoring the expiry of the time margin allocated to the processing operation, and on expiry of the time margin, if the execution of the processing operation has not been completed, to end the execution of the processing operation and execute a time quota overrun error handling operation.

According to one embodiment, the system is configured to: store the fact that some of the processing operations associated with a time window are fragmented, store for each processing operation fragment a time window and a time quota, for the execution of the processing operation fragment, store for a last fragment of each fragmented processing operation, as associated time margin, the time margin associated with the fragmented processing operation, and store for each processing operation fragment a state variable indicating whether the fragment is the last fragment of a fragmented processing operation, and during the execution of the application, not activate the error mode on expiry of the quota of a processing operation fragment if the state variable associated with the processing operation fragment indicates that the processing operation fragment is not a last fragment of a fragmented processing operation.

According to one embodiment, the system is configured to determine the margin of each of the processing operations associated with a time quota by applying a multiplying factor to the time quota of the processing operation, the multiplying factor being identical for all the processing operations associated with a time quota.

According to one embodiment, the system comprises a processor clocked by a first time base, to execute the processing operations, and receiving a second time base not regular compared to the first time base, the system being configured to determine the time windows associated with the processing operations in the second time base, a time unit in the second time base having a minimum value in the first time base, the multiplying factor being defined according to the minimum value.

According to one embodiment, the system is configured to: store for each processing operation a state variable indicating whether the processing operation performs an input/output in relation to a processor of the system executing the processing operation, and if one of the processing operations is associated with a state variable indicating that the processing operation does not perform any input/output, to launch the execution of the processing operation as soon as the execution of a previous processing operation ends, without waiting for the start of the time window of the processing operation.

Some examples of embodiments of the present invention will be described below in relation with, but not limited to, the accompanying figures, in which.

Figure 1:
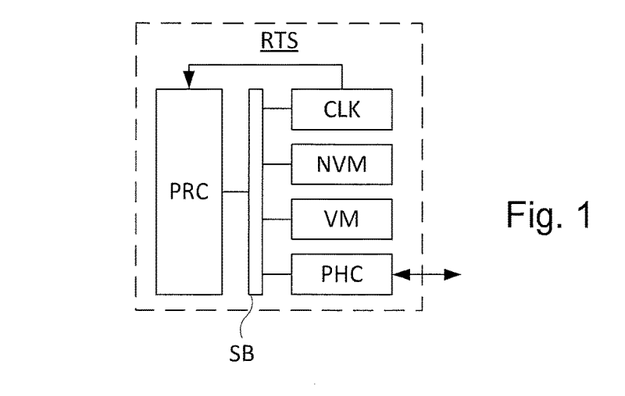
FIG. 1 schematically represents a multitasking computer.

FIG. 1 represents a multitasking computer RTS comprising one or more processors PRC, a clock circuit CLK, one or more non-volatile memories NVM (rewritable or not), one or more volatile memories VM (for example of RAM type—Random Access Memory), and one or more interface circuits PHC configured to control peripheral units (not represented) and/or receive signals from such units. The processor PRC is coupled to the circuits CLK, NVM, VM and PHC through an address and data bus SB. The clock circuit CLK is also connected to an interrupt input of the processor PRC, to trigger an interruption when a given programmable duration has elapsed. For this purpose, the processor PRC may transmit the value of the duration through the bus SB, and activate the circuit CLK.

The memory NVM stores the task programs of a multitasking application, and data relating to the application. The memory VM stores variable data used in the execution of the application. It shall be noted that the memory NVM may be omitted if the programs to be executed are transmitted to the computer when the multitasking application is launched.

The processor PRC may comprise one or more microprocessors or microcontrollers, which may each comprise one or more cores or processing units. The processor PRC may also be constituted of or comprise one or more circuits of ASIC (Application Specific Integrated Circuit) or FPGA (Field-Programmable Gate Array) type. The processor PRC executes a real-time core that particularly comprises functions necessary for the execution of a real-time multitasking application, such as functions for implementing a task scheduling plan, functions for managing task execution contexts, and functions for managing one or more watchdogs to monitor the execution time of the processing operations.

For a critical real-time application, it may be necessary to demonstrate that the execution medium (computer RTS) is sufficient, particularly in terms of computing power, to meet the worst-case execution time requirements of all the tasks of the application. Whatever the approaches used to schedule the tasks, this demonstration can be provided by the formal verification of a system of load equations (cf. documents [1], [2], [3]). The method presented here is independent of the choice of the scheduling method and of the associated system of load equations to be verified. To illustrate the method by an example, a general representation is used (cf. document [3] for example).

Figure 2A:
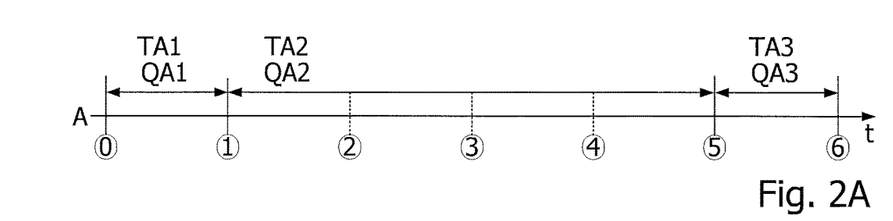
FIGS. 2A and 2B represent timing diagrams of two tasks.

FIG. 2A represents on a timing diagram, in a time base t, a cyclical task A that can be broken down into three processing operations TA1, TA2 TA3 executed repeatedly. The processing operation TA1 is executed over a time window noted [0,1[, defined by an earliest start time t=0 and a latest finish time t=1. The time window [0,1[ thus has a duration of one time unit. The processing operation TA2 is executed over a time window [1,5[ lasting 4 time units between the times t=1 and t=5. The processing operation TA3 is executed over a time window [5,6[ lasting one time unit between the times t=5 and t=6. The respective execution time requirements of the processing operations TA1, TA2, TA3 in each of these time windows [0,1[, [1,5[, [5,6[ are noted QA1, QA2 and QA3, these requirements being defined according to the capacities of a target multitasking computer.

Figure 2B:
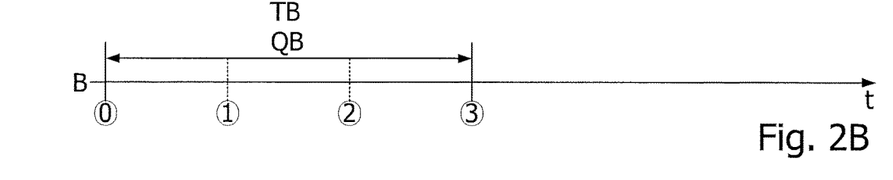

FIG. 2B represents on a timing diagram, in the same time base t, a cyclical task B that comprises only one processing operation TB, executed repeatedly, over a time window [0,3[ lasting 3 time units between the times t=0 and t=3. The execution time requirement of the processing operation TB in the time window [0,3[ is noted QB.

To build a scheduling plan of the tasks A and B, the processing operations of the tasks are distributed over their respective time windows such that the requirements of each processing operation are met. This leads to fragmenting certain processing operations over several shorter time windows, so that in each time window considered, the processing operations and/or processing operation fragments associated with this time window can be entirely executed, while respecting the time constraints of each task. In other words, the processing operations are fragmented so that all the time windows considered are contiguous (the end of one window corresponds to the start of another window) and disjoint (without any area common to two windows). This results in conditions on the processing operation fragments that must be met so that all the tasks of the application can be scheduled.

Figure 3:
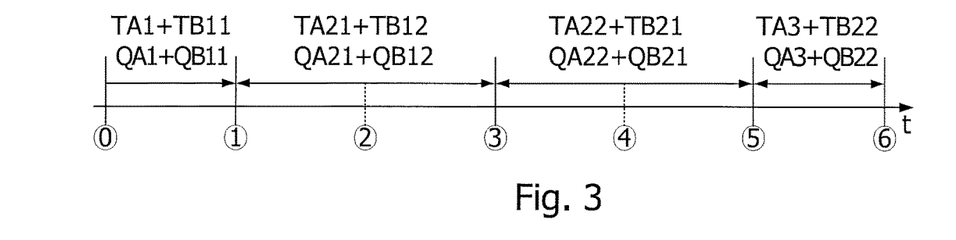
FIG. 3 schematically represents in the form of a timing diagram a scheduling plan of the two tasks of FIGS. 2A, 2B, FIG. 4 schematically represents in the form of a timing diagram, a load plan, according to one embodiment, FIG. 5 schematically represents in the form of a timing diagram, a load plan, according to another embodiment.

FIG. 3 represents a scheduling plan of the tasks A and B. The processing operation TA2 is fragmented into two parts TA21 and TA22 to take into account the time t=3 of task B which corresponds to the start of a time window for reactivating the processing operation TB, and which occurs during the time window of the processing operation TA2. In the same way, the processing operation TB of task B is fragmented over the time window [0,3[ into two parts TB11 and TB12 to take into account the start time t=1 of the time window [1,5[ of the processing operation TA2 of task A, which occurs during the time window of the processing operation TB. The occurrence of the processing operation TB associated with the time window [3,6[ is also fragmented into two parts TB21 and TB22 to take into account the start time t=5 of the time window of the processing operation TA3 of task A, due to the fact that this time occurs during the time window of this occurrence of the processing operation TB. These different fragmentations of the two occurrences of the processing operation TB are necessary to build a repetitive scheduling plan of the tasks A and B. The duration of the repetitive sequence of the tasks A, B taken together is equal to the lowest common multiple (LCM) of the durations of the repetitive sequences of each task. In the example of FIG. 3, task A is associated with a time window having a duration of 6 time units, whereas task B is associated with a time window having a duration of 3 time units. The duration of the repetitive sequence of the tasks A, B is equal to the LCM of 6 and 3, i.e. 6 time units, corresponding to two occurrences of the task B. It results from this fragmentation that the processing operation TA1 and the processing operation fragment TB11 must be executed during the time window [0,1[. The processing operation fragments TA21 and TB12 must be executed during the time window [1,3[. The processing operation fragments TA22 and TB21 must be executed during the time window [3,5[. The processing operation TA3 and the processing operation fragment TB22 must be executed during the time window [5,6[.

Furthermore, the execution time requirements of the processing operation fragments TA21 and TA22 are respectively noted QA21 and QA22. Similarly, the execution time requirements of the processing operation fragments TB11, TB12, TB21 and TB22 are respectively noted QB11, QB12, QB21 and QB22. In each time window represented in FIG. 3, a load equation (or inequation) to be verified can be defined so that the tasks A and B can be scheduled. This equation specifies that the sum of the requirements of the processing operations or processing operation fragments of a same time window is lower than the duration in time unit of the time window. Thus, the following system of load equations results from FIG. 3:

$$QA1+QB11 \leq 1 \quad (E1)$$

$$QA21+QB12 \leq 2 \quad (E2)$$

$$QA22+QB21 \leq 2 \quad (E3)$$

$$QA3+QB22 \leq 1 \quad (E4)$$

This system of equations defines a necessary and sufficient condition for certain scheduling algorithms, such as those presented in documents [1] and [3]. This system of equations is used to demonstrate that the sizing of the multitasking computer is correct. It shall be noted that for the RMS scheduling algorithm (Rate Monotonic Scheduling—cf. documents [1], [2]), this system does not define a sufficient condition in all cases, and this condition must be corrected according to a formula indicated in document [1]. However, this correction does not in any way change the method presented. The way the requirements QA21, QA22, QB11, QB12, QB21, QB22, of the fragments have been calculated has been defined by the scheduling theory and does not relate to the present invention. For more details, document [3] may be referred to for example.

According to one embodiment, a new system of load equations is derived from the system of load equations previously defined, by introducing a multiplying factor K greater than 1 in the left part of the unequal symbols. In the example of FIG. 3, the new load equation system is derived from the system (E1)-(E4) in the following manner;

$$K \cdot (QA1+QB11) \leq 1 \quad (E1')$$

$$K \cdot (QA21+QB12) \leq 2 \quad (E2')$$

$$K \cdot (QA22+QB21) \leq 2 \quad (E3')$$

$$K \cdot (QA3+QB22) \leq 1 \quad (E4')$$

According to the value of the factor K, this new system of equations may or may not have a solution. Therefore, a maximum multiplying factor Kx of the computing time requirements of the tasks is defined, such that the real-time application (executed by a given computer, for example the computer RTS) can be scheduled, i.e. such that the new system of equations (E1')-(E4') has a solution.

From the initial system of load equations (E1)-(E4), each requirement can be replaced with the same requirement multiplied by the factor Kx, while guaranteeing that the real-time application (executed by a given system) can be scheduled. In the example of FIG. 3, it is thus guaranteed that the extended requirements Kx·QA1 and Kx·QB11 can be scheduled over the first time window [0,1[, the extended requirements Kx·QA21 and Kx·QB12 over the second time window [1,3[, and so on.

Beyond the example used, the multiplication of the requirements by the factor Kx is applicable whatever the system of equations obtained by the scheduling method applied (cf. in particular documents [1], [2], [3]). It shall also be noted that for a critical real-time application, margins are usually kept on the requirements and performances of the multitasking computer on which the application must be executed. The factor Kx may thus be determined from the computing time margin so that for example 100% of the computing time resource of the computer is used. For example, a 20% margin corresponds to a value of the factor Kx equal to 5/4, and a 50% margin corresponds to a value of the factor Kx equal to 2. It shall also be noted that the margin concept is often poorly formalized, unlike the definition of the factor Kx which stipulates a formal criterion to be applied to measurable quantities. Multiplying the computing time requirements by the factor Kx thus offers the worst-case guarantee of always having at least the margin calculated for all the processing operations, and not an average value.

In the example presented in FIG. 3, the result of the definition of the factor Kx is that the maximum load is reached over at least one time window (where kx·Q=duration in time unit of the time window, Q being the requirement of the processing operations associated with the time window), but not necessarily over each of them depending on the values of the requirements.

As a result, the multiplication of the actual requirements of the processing operations by the factor Kx (greater than 1) enables a task scheduling plan to be obtained in which the actual execution time requirement Qi of each processing operation Ti is extended by adding an execution time margin Mi equal to (Kx−1)·Qi. The task scheduling plan may also comprise idle times corresponding to the remaining time windows where the maximum load is not reached.

To build the task scheduling plan, the values of the actual execution time requirements must be known, and the processing operations must be allocated to time windows. The actual requirements of the processing operations and the allocation of these processing operations to time windows enable the value of the factor Kx to be determined. The selected scheduling method may then be applied. Thus, from FIG. 3, assuming for example that the maximum load is reached over the first and second time windows [0,1[ and [1,3[, the following system of equations is obtained:

$$Kx \cdot (QA1+QB11)=1 \quad (E1'')$$

$$Kx \cdot (QA21+QB12)=2 \quad (E2'')$$

$$Kx \cdot (QA22+QB21) \leq 2 \quad (E3'')$$

$$Kx \cdot (QA3+QB22) \leq 1 \quad (E4'')$$

Figure 4:
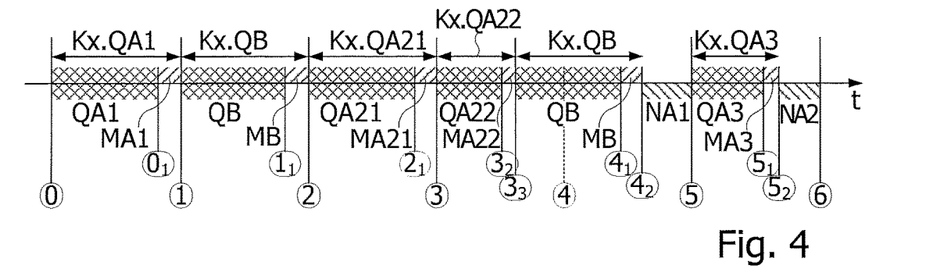

The verification of the system of equations (E1'')-(E4'') leads to the load plan represented in FIG. 4. FIG. 4 represents a load plan in the form of a timing diagram in which the time windows [i,i+1[ (with i=0, 1, 2, 3, and 5) are represented, the actual requirements QA1, QA21, QA22, QA3, QB are represented by cross-hatched areas along the time axis t, the associated execution time margins MA1, MA21, MA22, MA3, MB are represented by hatched areas above the time axis t, and by hatched areas below the time axis t, and the idle times NA1, NA2 of the time windows where the maximum load is not reached are represented. In this load plan, each time window is associated with a single processing operation or processing operation fragment. Given the duration in time unit of the time windows, the requirements of certain processing operation fragments may be defined. Thus, the requirements QB12 and QB22 of the two occurrences of the processing operation TB may be set to QB. The result is that the requirements QB12 and QB22 are set to 0.

It can be seen in the load plan of FIG. 4 that the processing operation TB is associated with two distinct time windows of different durations. Indeed, the load plan comprises two occurrences of the processing operation TB, one allocated to the time window [1,2[, and the other allocated to the time window [$3_2$,5[.

The load plan of FIG. 4 is also cut into time slots, each of which may be of the processing operation requirement, processing margin or idle time type. Thus the successive requirements QA1, QB, QA21, QA22, QB and QA3 are respectively associated with the time slots [0,$0_1$[, [$1_1,1_1$[, [$2,2_1$[, [$3,3_2$[, [$3_3,4_2$[ and [$5_1,5_1$[. The successive margins MA1, MB, MA21, MA22, MB, MA3 respectively associated with the time slots [$0_1$,1[, [$1_1$,2[, [$2_1$,3[, [$3_2,3_3$[, [$4_1,4_2$[ and [$5_1,5_2$[. The idle times NA1, NA2 are respectively associated with the time slots [$4_2$,5[ and [$5_2$,6[.

From the point of view of the multitasking computer load, the load plan of FIG. 4 is consistent with the equations (E1")-(E4"), but it can be noted that as certain processing operations are fragmented, the execution time margins associated with the requirements may also be fragmented. Thus, in the example above, the requirement QA2 appears fragmented into two distinct parts QA21 and QA22. The same is true of the associated margins MA21, MA22. This fragmentation may result in redefining the time windows. Indeed, the transition between the extended requirement Kx.QA22 of the processing operation fragment TA22, and the requirement QB of the second occurrence of the processing operation TB implies the presence at this time of a time window limit noted [$3_2$] on FIG. 4. The processing operation TA22 thus associated with the time window [3, $3_2$[. Furthermore, as the requirement QB of the second occurrence of the processing operation TB extends before and after the time [4], this time no longer corresponds to a time window limit. The second occurrence of the processing operation TB is thus associated with the time window [$3_2$,5[.

Figure 5:
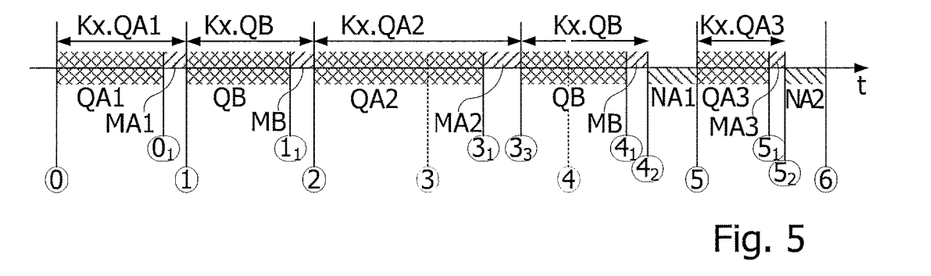

So as to provide a static scheduling plan enabling the margins allocated to the processing operations to be optimally used, particularly to handle errors and especially errors of overrunning a foreseen execution time requirement, the load plan may be rearranged as represented in FIG. 5. Compared to the load plan of FIG. 4, the load plan of FIG. 5 is modified by grouping together the execution time margins MA21 and MA22 associated with the requirements QA21 and QA22. For this purpose, the margin MA21 with the fragment TA21 has been moved to just before the margin MA22, and these two margins have been merged to form a margin MA2 equal to (Kx−1)·QA2. In the example of FIG. 5, the requirements QA21 and QA22 of the processing operation TA2 could also be merged, after moving the margin MA21, as they are contiguous. It shall be noted that the possibility of grouping together the requirements of processing operation fragments is not frequent due to the fact that a real-time application generally has more than two tasks. This grouping of requirements and margins also leads to redefining the time windows in question, while respecting the deadlines of the processing operations defined by the time windows initially allocated to the latter. Indeed, due to the grouping of the requirements QA21 QA22, the time [3] no longer corresponds to a time window limit. This grouping also leads to reallocating an end of requirement QA2 time [$3_1$] to the processing operation TA2, as the time [$3_2$] no longer corresponds to the end of a requirement or to the start of a margin. It shall be noted that the time window [2,$3_3$[ that is now allocated to the processing operation TA2 is included in the window [1,5[ initially allocated to this processing operation. This grouping thus leads to redefining the time slots between the times [2] and [$3_3$]. Thus, in the example of FIG. 5, the requirement QA2 of the processing operation TA2 is associated with the slot [2,$3_1$[, and the margin MA2 of this processing operation is associated with the slot [$3_1,3_3$[.

It is thus possible to build, for a set of tasks clocked by a same time base, a task scheduling plan guaranteeing that, in case of error, the time allocated to the handling of the error is guaranteed (without overrunning into the time allocated to the other processing operations), enabling an error handling operation in deterministic time compatible with the constraints of a critical real-time system made up of a multitasking computer executing a real-time application. In case of an error in sizing the multitasking computer, due to the variations in the execution time of the processing operations, this method enables the robustness of the real-time multitasking system to be improved by reducing as far as possible the cases of residual error to an extremely low number, and without interfering with the execution of the other tasks. This method thus enables a modular and compositional approach to scheduling the tasks of a real-time application, which reduces the tests needed to validate the sizing of the entire computer. This method makes it possible to produce critical real-time systems for which a time independence is required between all the tasks (non-interference), and to facilitate the certification of such systems. This method also enables the over-sizing of the execution processor to be reduced, which is a significant advantage for embedded computers having a relatively low processing capacity.

It shall be noted that in the general case, the time slots are not necessarily scheduled as in FIGS. 4 and 5. Indeed, if for each processing operation Ti, the order of the requirement Qi, margin MAi and possibly idle time NA slots is met, the time slots allocated to the different processing operations of the scheduling plan may be nested in any manner whatsoever. Thus, several quota-type time slots of different processing operations may be contiguous. Similarly, several margin-type time slots of different processing operations may be contiguous. It is merely important that the quota and margin time slots of each processing operation be included in the time window initially allocated to the processing operation.

The embodiments shown by FIGS. 4 and 5 also enable the length of the periods to be limited without stopping the execution of the processor PRC, which can restrict the temperature rise of the processor (with benefits in terms of reliability and service life). Periods during which the processor does not execute any processing operations belonging to critical tasks may also be used to execute non-critical tasks that very often have recurring requirements, such as the management of entries/exits with a low latency.

Generally speaking, compliance with the requirements allocated is controlled by a watchdog that is enabled when a processing operation or processing operation fragment is launched, with a time delay defining a time quota allocated to the processing operation or processing operation fragment, that can be set according to the value of the requirement of the processing operation or processing operation fragment. Thus, below, the execution time quotas allocated to the processing operations are equal to the requirements as previously defined. The watchdog is triggered at the end of the time delay if the processing operation or processing operation fragment is not completed.

Figure 6A:
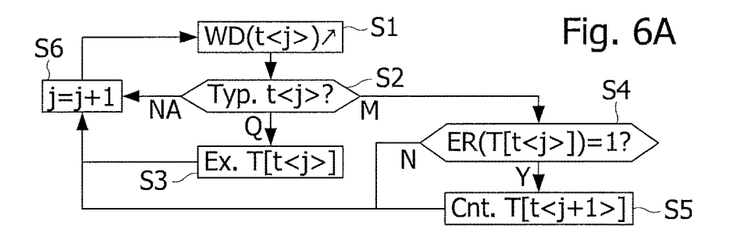
FIGS. 6A, 6B, 7 and 8 represent steps executed by a real-time core of the real-time computer, according to various embodiments.
Figure 6B:
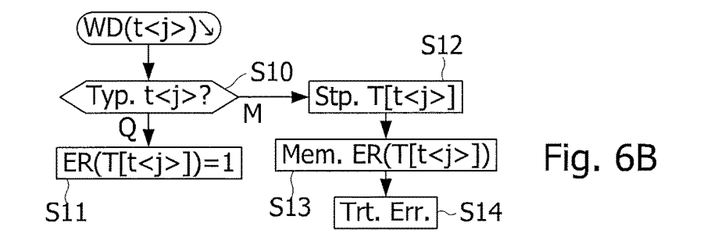

FIGS. 6A, 6B represent steps S1 to S6 and S10 to S14, that are executed by the real-time core of the computer RTS. Steps S1 to S6 of FIG. 6A are permanently executed to activate a watchdog WD so that it can possibly be triggered at the end of each time slot of the scheduling plan. Steps S10 to S14 of FIG. 6B are executed when the watchdog WD is triggered. Below, the term "processing operation" indifferently means a processing operation or a processing operation fragment. To execute some of the steps of FIGS. 6A, 6B, the real-time core of the computer RTS has tables that are generated from the scheduling plan or from the load plan of the processing operations of the tasks of the real-time application. These tables may particularly comprise lists of processing operations of the application, and lists of parameters defining the time slots allocated to each of the processing operations. In the list of the processing operations of the application, each processing operation Ti may be associated with one or more time slots of time quota Qi type and of time margin Mi type. In the list of time slots, each slot is associated with a processing operation or a processing operation fragment, with a type (quota, margin or idle time) and with the duration of the time slot and/or with the start and end times of the time slot.

On FIG. 6A, step S1 is executed at the start of a time slot noted t<j>. The processor PRC accesses the list of time slots to determine the parameters necessary to activate the watchdog WD so that the latter is triggered at the end of the time slot t<j>, and activates the watchdog. In step S2, the processor PRC determines the type of the time slot t<j>. If the time slot t<j> is of quota Q type, the processor PRC launches the processing operation T[t<j>] associated with the time slot t<j> in step S3. If the time slot t<j> is of margin M type, the processor PRC executes step S4. In step S4, the processor PRC tests an error indicator ER(T[t<j>]) associated with the processing operation T[t<j>]. If this error indicator ER(T[t<j>]) indicates that the processing operation T[t<j>] is in quota overrun error, the processor PRC continues the execution of the processing operation T[t<j>] in step S5. After the execution of steps S3, S5 and in the event that the processing operation T[t<j>] is not in quota overrun error, the processor PRC executes step S6 to increment a counter j whereby it is possible to go to the processing operation of the next time slot t<j+1>.

In step S10 of FIG. 6B, that is executed when the watchdog WD activated for the time slot t<j> is triggered (in the case of quota or margin overrun), the processor PRC determines whether the triggering of the watchdog is due to the expiry of a time quota or a time margin of a processing operation by testing the type (Q/M/NA) of the time slot t<j>. If the triggering of the watchdog WD is due to the expiry of a time quota, step S11 is executed. If this triggering is due to the expiry of a time margin, steps S12 to S14 are executed.

In step S11, the time quota allocated to the processing operation T[t<j>] has expired before the end of the execution of the processing operation. The processor PRC then goes into an error mode, for example by activating an error indicator ER for the processing operation T[t<j>]. In step S12, the time margin allocated to the processing operation T[t<j>] has expired, without the execution of the processing operation being complete. The processor PRC then stops the execution of the processing operation T[t<j>]. In step S13, the processor PRC may store the fact that a time quota overrun error has been detected for the processing operation T[t<j>]. In step S14, the processor PRC may execute a general error handling operation as provided in the real-time core. This general error handling operation is sufficiently short so as not to encroach on the next time window and thus on the time allocated to the next processing operation, in order to respect the rule of non-interference between processing operations. It may also be provided to execute an error handling operation specific to the application or to the processing operation T[t<j>] in quota overrun, during a subsequent time window, allocated to the processing operation, again to respect the rule of non-interference between processing operations.

It shall be noted that continuing the execution of a processing operation in the event of a time quota overrun error, results from a simple design choice of the real-time application. In some cases, provision may be made to implement other modes of handling this error that differ from the one previously described, such as permanently stopping the processing operation in time quota overrun error, and executing an alternative processing operation provided for a degraded operation of the task or of the real-time system, requiring a shorter execution time than the time margin of the error handling operation.

In the case of execution of a fragmented processing operation, the case in which the watchdog indicates the end of the quota allocated to a first or an intermediate fragment must be distinguished from the case in which it indicates the end of the requirement of the last fragment of a processing operation. In the first case, the watchdog merely indicates the change from one processing operation to another, upon a change of time window, during the execution of a fragmented processing operation. In the second case, the watchdog indicates that the quota of the fragmented processing operation has been entirely used, thus an anomaly.

According to one embodiment, when fragmented processing operations remain in the scheduling plan, a state variable is associated with each processing operation or processing operation fragment, to indicate whether it is a first fragment or an intermediate fragment of a fragmented processing operation, or whether the latter is a non-fragmented processing operation or a last fragment of a fragmented processing operation. This state variable is used so as not to allocate any margin to the processing operation fragment if it is a first fragment or an intermediate fragment, and not to generate any error on expiry of the time quota of the processing operation fragment. This state variable may be automatically generated for each processing operation or fragment, for example upon the generation of the executable code of the real-time application, and inserted into the tables defining the load plan of the application.

Figure 7:
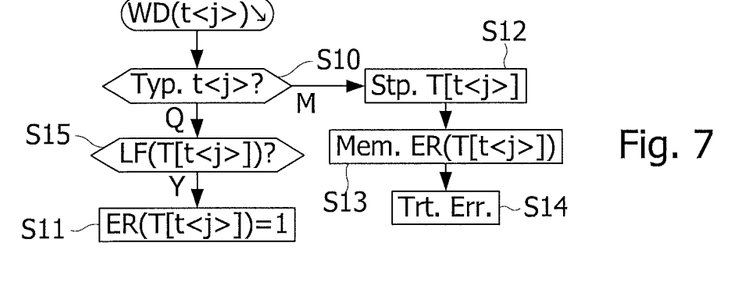

This state variable may be used for example as represented in FIG. 7. Thus, FIG. 7 represents steps S10 to S14 of FIG. 6B, and an additional step S15 interposed between steps S10 and S11. Step S15 is thus executed when the watchdog WD is triggered upon expiry of the time quota of the processing operation T[t<j>]. In step S15, the processor PRC tests a state variable LF(T[t<j>]) indicating whether the processing operation T[t<j>] is either a first fragment or an intermediate fragment of a fragmented processing operation, or a full processing operation (not fragmented) or a last fragment of a fragmented processing operation. If the variable LF(T[t<j>]) indicates that the processing operation being executed T[t<j>] is a full processing operation or a last fragment of a fragmented processing operation, step S11 described above is executed to activate the error mode. Otherwise, the error mode is not activated.

It shall be noted that as no time margin is allocated to a first fragment or an intermediate fragment of a fragmented processing operation, the entire time margin allocated to the fragmented processing operation is allocated to the last fragment of the fragmented processing operation.

According to one embodiment, a state variable is associated with each processing operation or processing operation fragment to indicate whether or not the latter performs entries and/or exits in relation to the processor PRC. An input/output means for example a write- or read-access to a global variable of the real-time application in the memory VM or NVM, or a signal or data transfer between the processor PRC and a peripheral unit via the circuit PHC. This state variable is used to anticipate a processing operation not performing any entries and/or exits, without waiting for the start of the time window with which it is associated. This state variable may be automatically generated for each processing operation or processing operation fragment for example upon generating the executable code of the real-time application, and inserted into the tables defining the load plan and the scheduling plan of the application.

Figure 8:
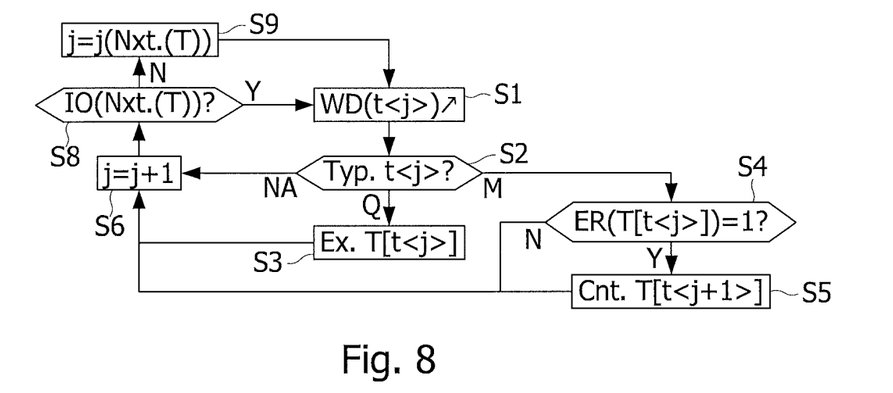

This state variable may be used for example as represented in FIG. 8. FIG. 8 represents steps S1 to S6 of FIG. 6A, and two additional steps S8 and S9 interposed between steps S6 and S1. In step S8, the processor PRC determines the next time slot associated with a processing operation Nxt.(T), and if this time slot is of quota Q type, it tests the state variable indicating the presence of entries/exits in the next processing operation Nxt.(T) in the load plan. If the variable IO(Nxt.(T)) indicates that the processing operation Nxt.(T) does not perform any entries/exits, the processor PRC executes step S9 to launch the execution of the processing operation Nxt.(T) in steps S1-S2-S3 for the time slot determined in step S8. Otherwise, step S1 is executed for the time window t<j+1> which follows the one that has just been processed. Naturally, it goes without saying that the steps of FIGS. 7 and 8 may be executed in combination, so as to implement both the state variables LF and IO.

This arrangement thus enables the processing operations planned in the sequencing plan to be dynamically anticipated, and thus the associated unused margins to be deferred, which results in grouping together the unused margins and any idle times into a single margin, to a time window associated with a processing operation or processing operation fragment performing entries/exits, which cannot be anticipated. This arrangement does not challenge the deterministic behavior of the system and the aforementioned operation guarantees. The grouping of margins and/or idle times offers the advantage of enabling the implementation of secondary activities which may comprise the execution of non-critical or non-real-time tasks, which can thus be executed with fewer interruptions and thus fewer execution context switches. The result is a gain in performance, and thus in energy consumption and in average temperature of the processor. If the processor is put into standby mode during the grouped margins, it can thus be put into standby mode for a longer time, which results in a drop in the temperature and energy consumption resulting from the duration of this standby mode. This margin grouping also enables a reduction in the number of activations of the processor standby mechanisms. In addition, the possibility of anticipating the processing operations enables the real-time system to be better sized and thus higher overall performances to be obtained. It shall be noted that these advantages are obtained without affecting the operating reliability of the real-time system.

In most real-time systems, the time measurement for controlling the execution time of the processing operations and the one used to describe the time constraints (breakdown of the time into time windows) are based on a same source, coming from a clock circuit, for example the circuit CLK. However, this condition is not necessary. Indeed, some real-time systems may be clocked to delimit the time windows by non-regular external events (not related to a clock signal). For example, these external events may be related to the position of a moving object, like the angular position of a crankshaft running at variable speed, or the phase of an alternating electric signal the period of which is not strictly constant.

In a conventional approach, having to use a non-regular time base does not enable a sequencing of tasks to be built easily, which leads to using dynamic scheduling algorithms. On the contrary, with the method presented above, it is possible to proceed in exactly the same way. The time requirements and quotas are still expressed in the execution time unit of the processor, defined by a first clock signal, whereas the time constraints, and thus the sequencing of the processing operations, are expressed in a different time base defined by a non-regular second signal, such as an angular position measurement signal for example. However, so that the application can be scheduled, there is a relation between the two signals, whereby it is possible to determine a minimum duration of a time unit of the second signal, measured with the first clock signal. In this case, the value of the factor Kx may still be calculated according to this minimum value. As a result, it is still possible to define the requirement margins by multiplying the requirements by the factor Kx.

According to one embodiment, the factor Kx is set to a value calculated according to the minimum duration of the time unit defined by the second signal, measured with the first clock signal. The result is that the respective durations of the margins are fixed, whereas the idle times vary and in particular increase when the time unit defined by the second signal moves away from its minimum value.

The same features and advantages as those previously described in terms of performance and reliability are thus maintained irrespective of the speed variations of the non-regular time base, on the basis of which the execution time constraints (i.e. the time windows) are defined.

It will be understood by those skilled in the art that the present invention is susceptible of various alternative embodiments and various applications. In particular, the invention is not limited to using the time margins to continue the execution of a processing operation in time quota overrun. Indeed, other error handling operations may be provided, such as executing an error handling operation specific to the processing operation for example.

Furthermore, the time margins allocated to the processing operations of a real-time application are not necessarily proportional to the time quotas allocated to these processing operations. Other modes for calculating the respective durations of the time margins may be used. It is merely important that the real-time application can be scheduled, given the time quotas and margins allocated, and the computing time resources allocated to the application. Thus, the margin allocated to each processing operation may be specifically defined according to the processing operation.

DOCUMENTS CITED

[1] "Scheduling Algorithms for Multiprogramming in a Hard Real-Time Environment", C. L. Liu, J. W. Layland, Journal of the Association for Computing Machinery, vol. 20, no. 1, January 1973, pp. 46-61.

[2] "Foundations of Real-Time Computing: Scheduling and Resource Management", edited by André M. Van Tilborg, Gary M. Koob, 1991, Kluwer Academic Publishers.

[3] "A Method and a Technique to Model and Ensure Timeliness in Safety Critical Real-Time Systems", C. Aussagués, V. David, Fourth IEEE International Conference on Engineering of Complex Computer Systems, 1998.

[4] Patent application WO/2002/039277 or US/2004/0078547.
[5] "The Worst-Case Execution Time Problem—Overview of Methods and Survey of Tools", R. Wilhelm, J. Engblom, A. Ermedahl, N. Holsti, S. Thesing, D. Whalley, G. Bernat, C. Ferdinand, R. Heckmann, T. Mitra, F. Mueller, I. Puaut, P. Puschner, J. Staschulat, P. Stenström, ACM Transactions on Embedded Computing Systems (TECS), 2007.
[6] "Giotto: A Time-Triggered Language for Embedded Programming", T. A. Henzinger, B. Horowitz, C. M. Kirsch, EMSOFT 2001, pp. 166-184, 2001, Springer-Verlag.
[7] Patent application WO/2006/050967.
[8] Patent application US/2010/0199280.

The invention claimed is:

1. A method for executing application tasks of a real-time application on a multitask computer, each application task comprising at least one processing operation, the method comprising:
    allocating time windows to processing operations of application tasks,
    allocating a respective time quota and a respective time margin to each processing operation having a time window, each time window allocated to one of the processing operations of the application having a duration longer than the time quota added to the time margin of the processing operation,
    executing the application by the multitask computer, by launching execution of each processing operation at a start of the time window allocated to the processing operation,
    setting in error mode one of the processing operations the execution of which is not completed on expiry of the time quota allocated to the processing operation, and
    continuing the execution of one of the processing operations set in error mode, on expiry of the time quota allocated to the processing operation, while monitoring expiry of the time margin allocated to the processing operation, and if the execution of the processing operation is not completed on expiry of the time margin allocated to the processing operation, ending the execution of the processing operation and executing a time quota overrun error handling operation.

2. The method according to claim 1, comprising:
    fragmenting processing operations allocated to a time window extending over several time windows allocated to other processing operations of the application, so that each time window is exclusively associated with a processing operation or processing operation fragment,
    allocating a time quota to each of the processing operation fragments such that the sum of the time quotas allocated to all the fragments of the fragmented processing operation is equal to the time quota of the fragmented processing operation, the time margin allocated to the fragmented processing operation being allocated to a last fragment of the fragmented processing operation, and
    associating with each processing operation fragment a state variable indicating whether it is the last fragment of the fragmented processing operation, the fragmented processing operation being set in error mode on expiry of the quota allocated to a processing operation fragment of the fragmented processing operation only if the state variable associated with the processing operation fragment indicates that the processing operation fragment is a last fragment of a fragmented processing operation.

3. The method according to claim 1, wherein the time margin allocated to each of the processing operations having a time window is calculated by applying a multiplying factor to the time quota allocated to the processing operation, the multiplying factor being identical for all the processing operations of the application having a time window.

4. The method according to claim 3, wherein the multiplying factor is determined so that the tasks of the application can be scheduled according to the time requirements of the processing operations, to the time windows allocated to the processing operations, and to the features of the computer.

5. The method according to claim 3, wherein the processing operations are executed by a processor of the computer, clocked by a first time base, and the time windows allocated to the processing operations are defined in a second time base not regular compared to the first time base, a time unit in the second time base having a minimum value in the first time base, the multiplying factor being defined according to the minimum value.

6. The method according to claim 1, wherein each processing operation of the application, having a time window, is associated with a state variable indicating whether it performs an input/output in relation to a processor of the computer, executing the processing operation, and, if one of the processing operations is associated with a state variable indicating that the processing operation does not perform any input/output, the execution of the processing operation is launched without waiting for the start of the time window allocated to the processing operation, as soon as the execution of a previous processing operation ends.

7. A real-time multitask system comprising a multitask computer executing a real-time application comprising several application tasks, each application task comprising at least one processing operation, the system being configured to:
    store in a computer memory time windows, each associated with the execution of a set of processing operations of tasks of the application,
    store in the computer memory, for each processing operation having a time window, a time quota and a time margin, the time window of the processing operation having a duration longer than the time quota added to the time margin of the processing operation,
    execute the application, the execution of the application comprising launching execution by the computer of each of the processing operations of the application at a start of the time window allocated to the processing operation,
    set in error mode one of the processing operations the execution of which is not completed on expiry of the time quota allocated to the processing operation, and
    continue the execution of one of the processing operations set in error mode, on expiry of the time quota allocated to the processing operation, while monitoring expiry of the time margin allocated to the processing operation, and if the execution of the processing operation is not completed on expiry of the time margin allocated to the processing operation, end the execution of the processing operation and executing a time quota overrun error handling operation.

8. The system according to claim 7, configured to store in the computer memory:
   the fact that some of the processing operations associated with a time window are fragmented,
   for each processing operation fragment, a time window and a time quota, for the execution of the processing operation fragment,
   for a last fragment of each fragmented processing operation, as associated time margin, the time margin associated with the fragmented processing operation, and
   for each processing operation fragment, a state variable indicating whether the fragment is the last fragment of a fragmented processing operation,
   the computer being configured to, during the execution of the application, set one of the fragmented processing operation in error mode on expiry of the quota of a processing operation fragment of the fragmented processing operation, only if the state variable associated with the processing operation fragment indicates that the processing operation fragment is a last fragment of a fragmented processing operation.

9. The system according to claim 7, wherein the time margin allocated to each of the processing operations having a time window is determined by applying a multiplying factor to the time quota of the processing operation, the multiplying factor being identical for all the processing operations of the application having a time window.

10. The system according to claim 9, wherein the computer comprises a processor clocked by a first time base, to execute the processing operations, and receiving a second time base not regular compared to the first time base, the computer being configured to determine the time windows allocated to the processing operations in the second time base, a time unit in the second time base having a minimum value in the first time base, the multiplying factor being defined according to the minimum value.

11. The system according to claim 7, configured to store in the computer memory for each processing operation of the application, having a time window, a state variable indicating whether the processing operation performs an input/output in relation to a processor of the computer executing the processing operation, the computer being configured to launch the execution of one of the processing operations as soon as the execution of a previous processing operation ends, without waiting for the start of the time window of the processing operation, if the processing operation is associated with a state variable indicating that the processing operation does not perform any input/output.

* * * * *